(12) United States Patent
Cherian et al.

(10) Patent No.: US 9,262,086 B2
(45) Date of Patent: *Feb. 16, 2016

(54) SYSTEMS AND METHODS FOR DE-DUPLICATION IN STORAGE SYSTEMS

(71) Applicant: DELL PRODUCTS L.P., Round Rock, TX (US)

(72) Inventors: Jacob Cherian, Austin, TX (US); Itay Dar, Rishon LeZion (IL)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,179

(22) Filed: Jan. 22, 2015

(65) Prior Publication Data

US 2015/0134908 A1     May 14, 2015

Related U.S. Application Data

(63) Continuation of application No. 13/359,600, filed on Jan. 27, 2012, now Pat. No. 8,949,199.

(60) Provisional application No. 61/581,439, filed on Dec. 29, 2011.

(51) Int. Cl.
    *G06F 17/30*     (2006.01)
    *G06F 3/06*     (2006.01)

(52) U.S. Cl.
    CPC ............ *G06F 3/0619* (2013.01); *G06F 3/0608* (2013.01); *G06F 3/0641* (2013.01); *G06F 3/0665* (2013.01); *G06F 3/0689* (2013.01); *G06F 17/30156* (2013.01)

(58) Field of Classification Search
    USPC ................................................. 707/692, 697
    See application file for complete search history.

(56) References Cited

U.S. PATENT DOCUMENTS

| | | | |
|---|---|---|---|
| 8,244,992 B2 * | 8/2012 | Spackman | 711/154 |
| 8,392,384 B1 | 3/2013 | Wu et al. | 707/693 |
| 8,396,841 B1 | 3/2013 | Janakiraman | 707/692 |
| 8,442,942 B2 * | 5/2013 | Leppard | 707/616 |
| 2004/0205253 A1 | 10/2004 | Arndt et al. | 710/1 |
| 2011/0238635 A1 * | 9/2011 | Leppard | 707/693 |
| 2011/0289281 A1 * | 11/2011 | Spackman | 711/154 |
| 2012/0030477 A1 | 2/2012 | Lu et al. | 713/189 |
| 2013/0124474 A1 | 5/2013 | Anderson | 707/634 |

* cited by examiner

*Primary Examiner* — Baoquoc To
(74) *Attorney, Agent, or Firm* — Baker Botts L.L.P.

(57) ABSTRACT

In accordance with embodiments of the present disclosure, a storage system may include a storage array comprising one or more storage resources, a processor communicatively coupled to the storage array, and a de-duplication module comprising instructions embodied on a computer-readable medium communicatively coupled to the processor. The de-duplication module may be configured to, when read and executed by the processor: generate a fingerprint for an item of data stored on the storage array; identify a partition for the fingerprint; associate the partition with a hardware instance selected from a plurality of hardware instances, wherein each particular hardware instance comprises one or more information handling resources; and query the selected hardware instance to determine if the fingerprint exists on the hardware instance.

16 Claims, 3 Drawing Sheets

SYSTEMS AND METHODS FOR DE-DUPLICATION IN STORAGE SYSTEMS

RELATED APPLICATION

This Application is a continuation of U.S. patent application Ser. No. 13/359,600 filed Jan. 27, 2012; which claims the benefit of U.S. Provisional Patent Application Ser. No. 61/581,439 filed Dec. 29, 2011, and which are hereby incorporated by reference in its entirety for all purposes.

TECHNICAL FIELD

The present disclosure relates in general to information handling systems, and more particularly to de-duplication in storage systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Data de-duplication is a process by which a footprint of data on a storage system may be reduced by identifying and eliminating redundant copies of similar data with storage resources of a storage system. Traditionally, in order to identify duplicate data, items (e.g., files, portions of files, etc.) of data are fingerprinted (e.g., by applying a hash function, cryptographic function, or other function) and such fingerprints are stored in a structure, sometimes referred to as a dictionary, that allows for quick lookup and insertion in the event an item of data has not been encountered before. When duplicate data is identified redundant copies may be eliminated and other structures are updated to ensure that consistency of the data is maintained through additions and deletions. A monolithic dictionary is often suitable in the case of the storage system that does not provide scalability, but may cause problems with performance and scalability in clustered scale-out storage systems and other storage systems.

SUMMARY

In accordance with the teachings of the present disclosure, the disadvantages and problems associated with de-duplication in scalable storage systems have been reduced or eliminated.

In accordance with embodiments of the present disclosure, a storage system may include a storage array comprising one or more storage resources, a processor communicatively coupled to the storage array, and a de-duplication module comprising instructions embodied on a computer-readable medium communicatively coupled to the processor. The de-duplication module may be configured to, when read and executed by the processor: generate a fingerprint for an item of data stored on the storage array; identify a partition for the fingerprint; associate the partition with a hardware instance selected from a plurality of hardware instances, wherein each particular hardware instance comprises one or more information handling resources; and query the selected hardware instance to determine if the fingerprint exists on the hardware instance.

In accordance with other embodiments of the present disclosure, a method may include generating a fingerprint for an item of data stored on the storage array. The method may further include identifying a partition for the fingerprint. The method may also include associating the partition with a hardware instance selected from a plurality of hardware instances, wherein each particular hardware instance comprises one or more information handling resources. The method may additionally include querying the selected hardware instance to determine if the fingerprint exists on the hardware instance.

Technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
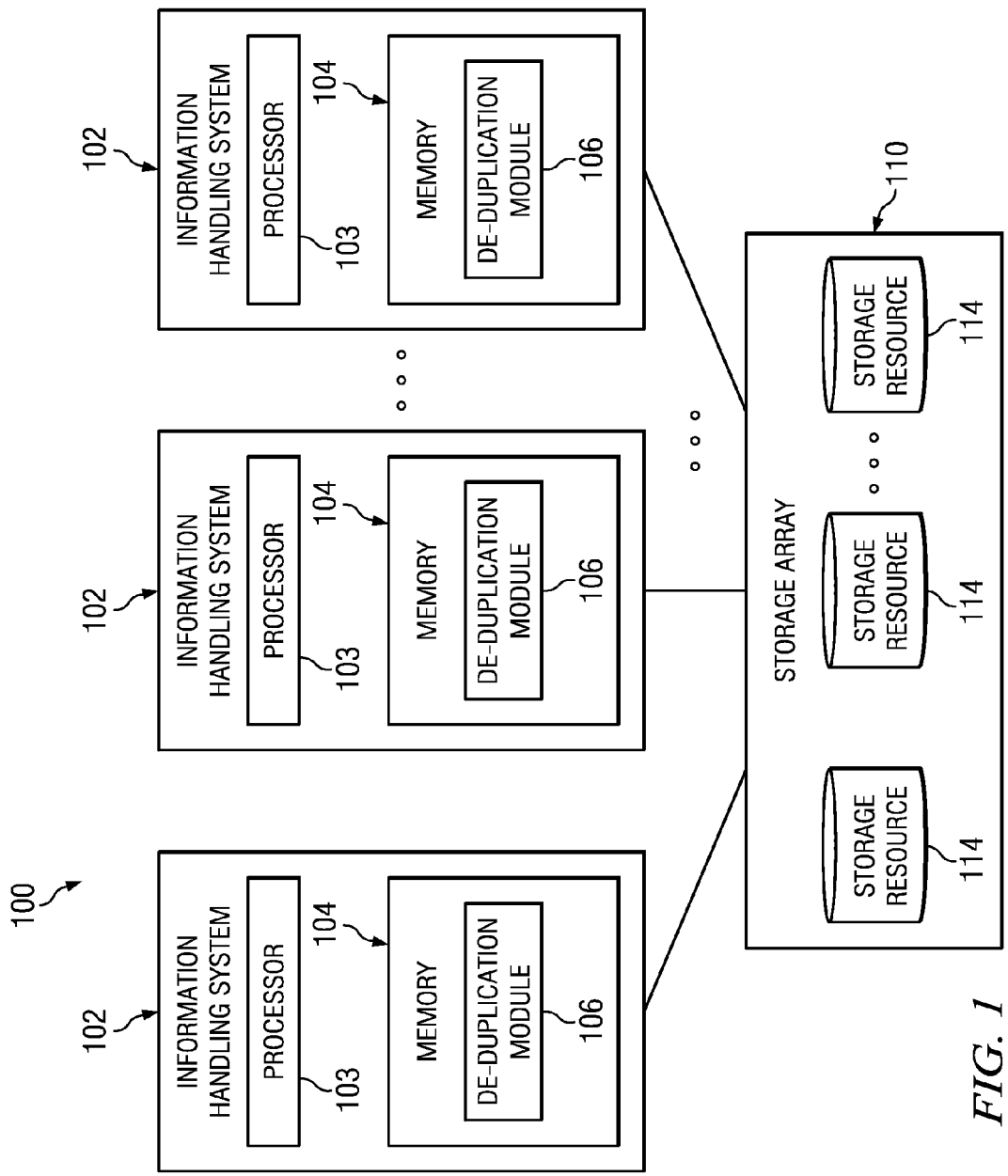
FIG. 1 illustrates a block diagram of an example storage system, in accordance with certain embodiments of the present disclosure.

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

An information handling system may include or may be coupled to an array of physical storage resources. The array of physical storage resources may include a plurality of physical storage resources, and may be operable to perform one or more input and/or output storage operations, and/or may be structured to provide redundancy. In operation, one or more physical storage resources disposed in an array of physical storage resources may appear to an operating system as a single logical storage unit or "virtual storage resource."

In certain embodiments, an array of physical storage resources may be implemented as a Redundant Array of Independent Disks (also referred to as a Redundant Array of Inexpensive Disks or a RAID). RAID implementations may employ a number of techniques to provide for redundancy, including striping, mirroring, and/or parity generation/checking. As known in the art, RAIDs may be implemented according to numerous RAID levels, including without limitation, standard RAID levels (e.g., RAID 0, RAID 1, RAID 3, RAID 4, RAID 5, and RAID 6), nested RAID levels (e.g., RAID 01, RAID 03, RAID 10, RAID 30, RAID 50, RAID 51, RAID 53, RAID 60, RAID 100), non-standard RAID levels, or others.

FIG. 1 illustrates a block diagram of an example storage system 100, in accordance with certain embodiments of the present disclosure. As depicted in FIG. 1, system 100 may include one or more information handling systems 102 and a storage array 110 communicatively coupled to each information handling system 102.

Information handling system 102 may generally be operable to receive data from and/or communicate data to storage array 110. In certain embodiments, information handling system 102 may be a server. In another embodiment, information handling system 102 may be a dedicated storage system such as, for example, a network attached storage (NAS) system or an external block storage controller responsible for operating on the data in storage array 110 and sending and receiving data from hosts coupled to the storage system. As depicted in FIG. 1, an information handling system 102 may include a processor 103 and a memory 104 communicatively coupled to processor 103.

A processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, a processor 103 may interpret and/or execute program instructions and/or process data stored in an associated memory 104 and/or another component of an information handling system 102.

A memory 104 may be communicatively coupled to an associated processor 103 and may include any system, device, or apparatus configured to retain program instructions and/or data for a period of time (e.g., computer-readable media). A memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to an information handling system 102 is turned off.

As shown in FIG. 1, each memory 104 may have stored thereon a de-duplication module 106. A de-duplication module 106 may comprise a program of one or more instructions that may, when loaded from memory 104 by a processor 103 and in concert with de-duplication modules 106 of other information handling systems 102, perform de-duplication, in accordance with the present disclose. For example, a de-duplication module 106 may alone or in combination with other de-duplication modules, calculate fingerprints for items of data, partition the fingerprints into a plurality of partitions, assign each of the plurality of partitions to information handling resources, as described in greater detail below, and de-duplicate identified duplicate data based on fingerprints.

In addition to a processor 103 and a memory 104, an information handling system may include one or more other information handling resources. An information handling resource may include any component system, device or apparatus of an information handling system, including without limitation a processor (e.g., processor 103), bus, memory (e.g., memory 104), input-output device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Storage array 110 may comprise any system, device, or apparatus having a plurality of physical storage resources 114 communicatively coupled to information handling systems 102. Storage resources 114 may include hard disk drives, magnetic tape libraries, optical disk drives, magneto-optical disk drives, compact disk drives, compact disk arrays, disk array controllers, and/or any computer-readable medium operable to store data. In some embodiments, storage resources 114 may form all or part of a redundant storage array (e.g., a RAID). In such embodiments, storage resources 114 participating in the redundant storage array may appear to an operating system executing on information handling system 102 as a single logical storage unit or virtual resource. Thus, information handling system 102 may "see" a logical unit instead of seeing each individual physical storage resource 114. Although FIG. 1 depicts storage resources 114 as components of system 100 separate from information handling system 102, in some embodiments, one or more storage resources 114 may be integral to information handling system 102. Storage resources 114 may be housed in one or more storage enclosures configured to hold and power storage resources 114.

In some instances, storage resources 114 may have stored thereon duplicate data. Accordingly, it may desirable to identify and reduce duplicate data in order to reduce the footprint of stored data and hence the information handling resources required to store the data. In operation, de-duplication modules 106 may, individually or in concert, de-duplicate data as set forth below with reference to the discussion of FIGS. 2 and 3.

Figure 2:
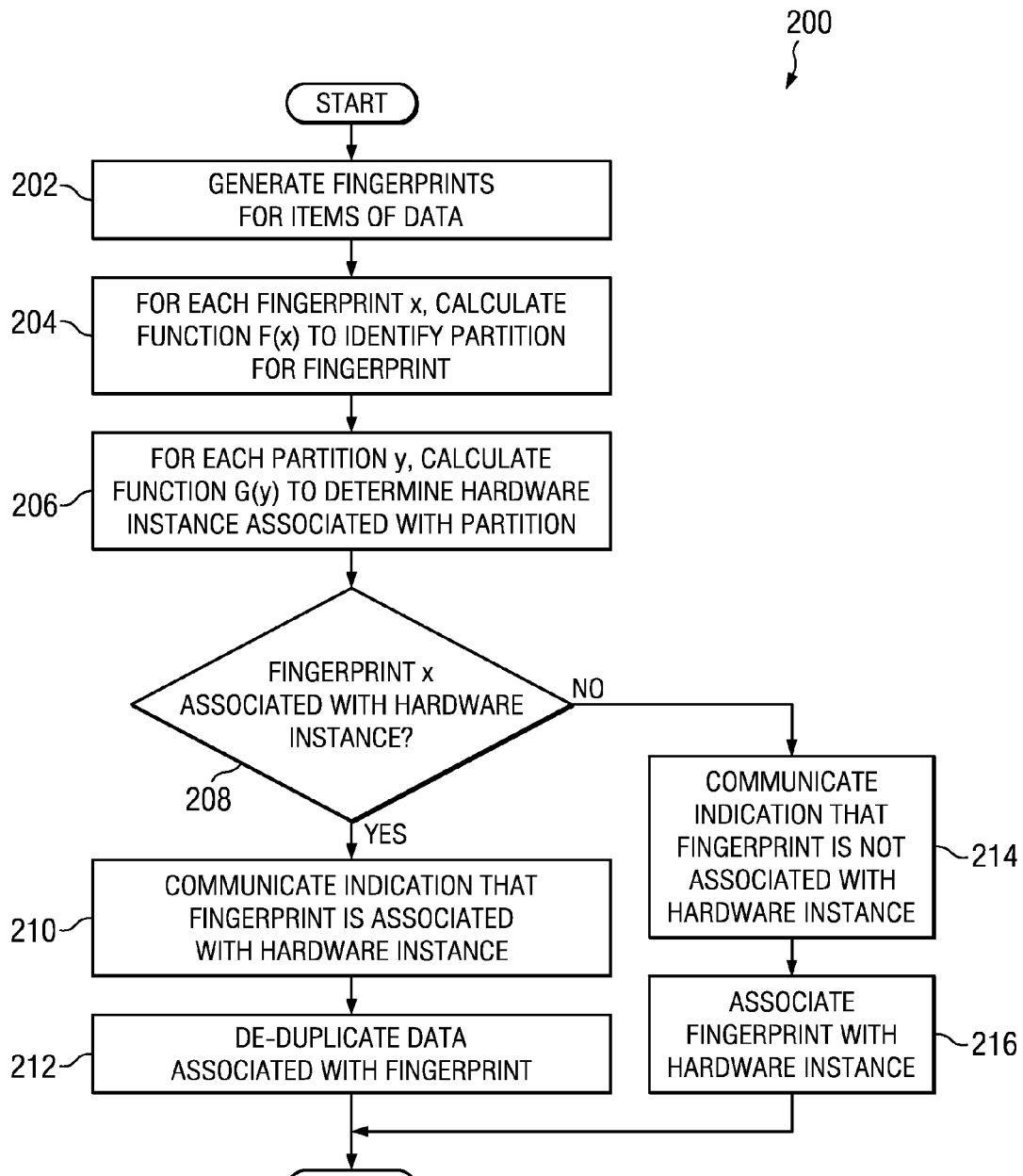
FIG. 2 illustrates a flow chart of an example method for partitioning fingerprints and associating partitions to information handling resources, in accordance with the present disclosure.

FIG. 2 illustrates a flow chart of an example method 200 for partitioning fingerprints and associating partitions to information handling resources, in accordance with the present disclosure. According to one embodiment, method 200 may begin at step 202. As noted above, teachings of the present disclosure may be implemented in a variety of configurations of system 100. As such, the preferred initialization point for method 200 and the order of the steps 202-216 comprising method 200 may depend on the implementation chosen.

At step 202, de-duplication modules 106 may, individually or in concert, calculate a fingerprint for an item of data stored in storage array 114. Fingerprints may be calculated using a hash, cryptographic function, or other function. As used herein, an "item" of data may broadly refer to any unit of data, including without limitation a file, page, block, or any other suitable unit of data.

At step 204, de-duplication modules 106 may, individually or in concert, calculate a function $y=F(x)$ to identify a partition y for each fingerprint x. The number of partitions n may be any suitable integer number, and the value of y may comprise any integer number from 0 to n−1. The function $F(x)$ may be any suitable function operable to map all possible values of x to a corresponding value of y. In some embodiments, $F(x)$ may be operable to map fingerprints x into partitions y such that, if all possible fingerprints x existed, the number of fingerprints x in each partition y would approximately be equal (e.g., the number of fingerprints in one partition does not vary by more than one from the number of fingerprints in another partition).

At step 206, de-duplication modules 106 may, individually or in concert, calculate a function $z=G(y)$ to determine a hardware instance z associated with each partition y, wherein each such hardware instance comprises one or more information handling resources configured to store fingerprints as part of a dictionary and/or respond to queries relating to fingerprints associated with such information handling resource. For example, a hardware instance may comprise an information handling system 102, a processor 103, a memory 104, and/or one or more other information handling resources. If m represents the number of hardware instances to which partitions may be assigned, the value of z may comprise any integer number from 0 to m−1. The function $G(y)$ may be any suitable function operable to map all possible values of y to a corresponding value of z. In some embodiments, $G(y)$ may be operable to map partitions y into hardware instances z such that the number of partitions y associated with each hardware instance z would approximately be equal (e.g., the number of partitions associated with one hardware instance does not vary by more than one from the number of partitions associated with another hardware instance).

At step 208, de-duplication modules 106 may, individually or in concert, based on a determined hardware instance z returned by function $G(y)$, query the hardware instance to determine whether a particular fingerprint is associated with (e.g., stored on) the hardware instance. If the fingerprint is associated with the hardware instance, method 200 may proceed to step 210. Otherwise, if fingerprint is not associated with the hardware instance, method 200 may proceed to step 214.

At step 210, in response to a determination that the fingerprint is associated with the hardware instance, the hardware instance may communicate an indication (e.g., to one or more de-duplication modules 106) that the fingerprint is associated with the hardware instance, which may indicate presence of duplicate data.

At step 212, in response to receipt of an indication that a fingerprint is associated with the hardware instance, de-duplication modules 106 may, individually or in concert, perform an operation to de-duplicate data having the fingerprint, in accordance with known approaches to de-duplication. After completion of step 212, method 200 may end.

At step 214, in response to a determination that the fingerprint is not associated with the hardware instance, the hardware instance may communicate an indication (e.g., to one or more de-duplication modules 106) that the fingerprint is not associated with the hardware instance, which may that data associated with the fingerprint is not duplicate.

At step 216, in response to receipt of an indication that a fingerprint is not associated with the hardware instance, hardware instances and/or de-duplication modules 106 may, individually or in concert, store the fingerprint in its associated hardware instance. After completion of step 216, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

Figure 3:
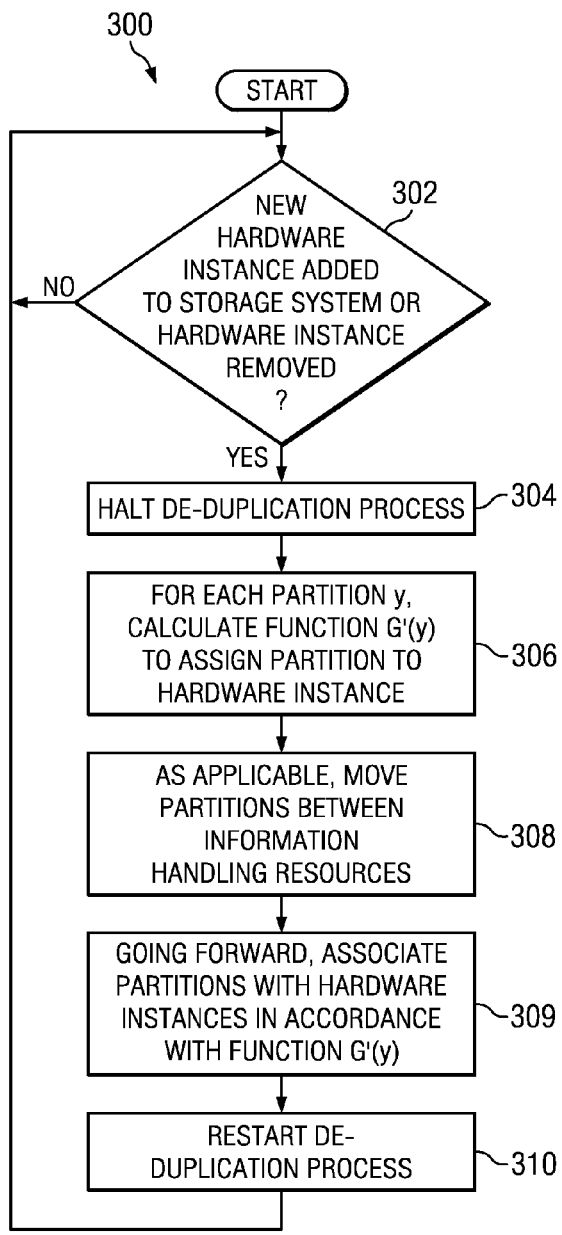
FIG. 3 illustrates a flow chart of an example method for associating partitions to information handling resources in response to addition or subtraction of information handling resources, in accordance with the present disclosure.

FIG. 3 illustrates a flow chart of an example method 300 for associating partitions to information handling resources in response to addition or subtraction of information handling resources, in accordance with the present disclosure. According to one embodiment, method 300 may begin at step 302. As noted above, teachings of the present disclosure may be implemented in a variety of configurations of system 100. As such, the preferred initialization point for method 300 and the order of the steps 302-310 comprising method 300 may depend on the implementation chosen.

At step 302, de-duplication modules 106 may, individually or in concert, determine if a new hardware instance has been added to storage system 100 or a hardware instance has been removed from storage system 100. If a new hardware instance has been added or a hardware instance has been removed, method 300 may proceed to step 304. Otherwise, method 300 may remain at step 302 until a new hardware instance is added or a hardware instance is removed.

At step 304, in response to a determination that a new hardware instance has been added to storage system 100 or a hardware instance has been removed from storage system 100, de-duplication modules 106 may, individually or in concert, temporarily halt existing de-duplication processes.

At step 306, de-duplication modules 106 may, individually or in concert, calculate the function $z=G'(y)$ to assign each partition y to a hardware instance z, similar to that of step 206 of method 200. If m' represents the new number of hardware instances to which partitions may be assigned, the value of z may comprise any integer number from 0 to m'−1. The function G'(y) may be any suitable function operable to map all possible values of y to a corresponding value of z. In some embodiments, G'(y) may be operable to map partitions y into hardware instances z such that the number of partitions y associated with each hardware instance z would approximately be equal (e.g., the number of partitions associated with one hardware instance does not vary by more than one from the number of partitions associated with another hardware instance).

At step 308, de-duplication modules 106 may, individually or in concert, move de-duplication operations between hardware instances for any partitions whose assigned hardware instances have changes as a result of the calculation performed at step 306.

At step 309, de-duplication modules 106 may, individually or in concert, from then on associate partitions y with hardware instances z in accordance with the function G'(y).

At step 310, de-duplication modules 106 may, individually or in concert, restart the de-duplication processes at each hardware instance such that each hardware instance performs de-duplication of data associated with the fingerprints assigned to the particular hardware instance, in accordance with known approaches to de-duplication (e.g., comparison of fingerprints assigned to the hardware instance to determine if any match exists, and deletion of duplicate data when fingerprints are found to match).

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order. For example, although method 300 contemplates the recalculation of G(y) in response to addition or removal of a hardware instance from storage system 100, in some embodiments a recalculation of F(x) may be performed in response to addition or removal of a hardware instance from storage system 100 and/or in response to other changes to software system 100.

Method 300 may be implemented using system 100 or any other system operable to implement method 300. In certain embodiments, method 300 may be implemented partially or fully in software and/or firmware embodied in computer-readable media.

Although the foregoing contemplates that method 300 may execute in response to a determination that a hardware instance was added or removed at steps 302 and 304, other triggers may be used for recalculation of the function G(y). For example, in some embodiments, recalculation may be triggers by a partition y becoming loaded.

Figure 4:
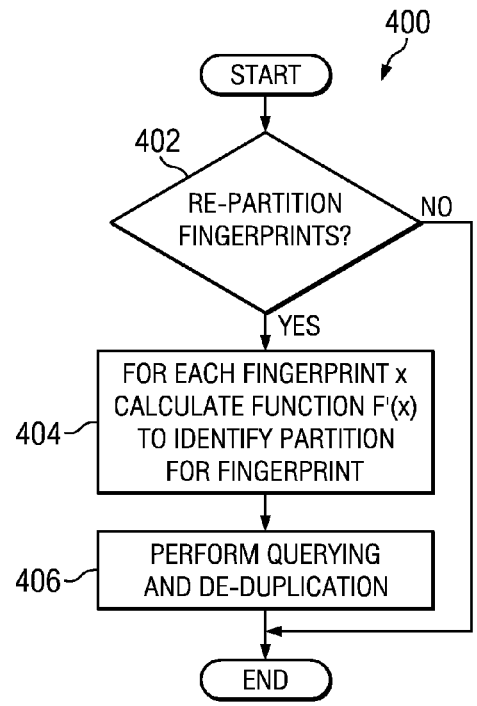
FIG. 4 illustrates a flow chart of an example method for re-partitioning fingerprints in response to addition of data, in accordance with the present disclosure.

FIG. 4 illustrates a flow chart of an example method 400 for re-partitioning fingerprints in response to re-partitioning trigger in accordance with embodiments of the present disclosure. Such a re-partitioning may occur where a volume of data increases significantly such that the data approaches system limits relevant to how the partitions are managed on a hardware instance or the number of information handling systems 102 scales to the point that a then-present number of partitions does not allow for significantly equal distribution of work among hardware instances. According to one embodiment, method 400 may begin at step 402. As noted above, teachings of the present disclosure may be implemented in a variety of configurations of system 100. As such, the preferred initialization point for method 400 and the order of the steps 402-410 comprising method 400 may depend on the implementation chosen.

At step 402, de-duplication modules 106 may, individually or in concert, determine whether to re-partition fingerprints. The determination to re-partition may be made for any suitable reason, including without limitation, addition or deletion of data in system 100. If a determination is made to re-partition, method 400 may proceed to step 404. Otherwise, if a determination is not made to repartition, method 400 may end.

At step 404, de-duplication modules 106 may, individually or in concert, calculate a function y=F'(x) to identify a partition y for each fingerprint x. The function F'(x) may be related to the function F(x) such that the function F'(x) divides each existing partition n defined by F(x) into two or more partitions. Thus, in embodiments in which existing partitions are divided into two partitions. The value of y may comprise any integer number from 0 to 2n−1. The function F'(x) may be any suitable function operable to map all possible values of x to a corresponding value of y. In some embodiments, F'(x) may be operable to map fingerprints x into partitions y such that, if all possible fingerprints x existed, the number of fingerprints x in each partition y would approximately be equal (e.g., the number of fingerprints in one partition does not vary by more than one from the number of fingerprints in another partition).

At step 405, de-duplication modules 106 may, individually or in concert, from then on associate fingerprints x with partitions y in accordance with the function F'(x).

At step 406, method de-duplication modules 106 may, individually or in concert, may perform querying and de-duplication similar to that detailed in steps 206-216 of method 200.

Although FIG. 4 discloses a particular number of steps to be taken with respect to method 400, method 400 may be executed with greater or lesser steps than those depicted in FIG. 4. In addition, although FIG. 4 discloses a certain order of steps to be taken with respect to method 400, the steps comprising method 400 may be completed in any suitable order.

Method 400 may be implemented using system 100 or any other system operable to implement method 400. In certain embodiments, method 400 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A storage system, comprising:
   a storage array comprising one or more physical storage resources;
   a processor communicatively coupled to the storage array;
   a de-duplication module comprising instructions embodied on a non-transitory computer-readable medium communicatively coupled to the processor, the de-duplication module configured to, when read and executed by the processor:
   generate a fingerprint for an item of data stored on the storage array;
   identify a partition for the fingerprint;
   associate the partition with a selected hardware instance selected from a plurality of hardware instances, wherein each particular hardware instance comprises one or more information handling resources; and
   query the selected hardware instance to determine whether the fingerprint exists on the hardware instance; wherein the de-duplication module configured to, in order to identify each partition, calculate a function to identify a partition for each fingerprint: wherein the function is operable to map all possible fingerprints to a corresponding partition; and the function operable to map each fingerprint to a partition such that the number of fingerprints associated with each partition would be approximately equal.

2. The storage system according to claim 1, further comprising the plurality of hardware instances, each hardware instance configured to respond to the query with an indication of whether the fingerprint exists on the hardware instance.

3. The storage system according to claim 2, at least one of the de-duplication module and at least one of the hardware instances further configured to add the fingerprint to the hardware instance if the fingerprint does not exist on the hardware instance.

4. The storage system according to claim 1, the de-duplication module further configured to de-duplicate data associated with the fingerprint if the fingerprint exists on the hardware instance.

5. The storage system according to claim 1, wherein one of the plurality of hardware instances comprises the processor.

6. The storage system according to claim 1, the de-duplication module configured to generate fingerprints, identify partitions, and associate partitions with hardware instances in concert with one or more other de-duplication modules executing on one or more other processors.

7. The storage system according to claim 1, the de-duplication module configured to, in order to associate each partition with a hardware instance, calculate a second function to assign each partition to a hardware instance; wherein the second function is operable to map all possible partitions to a corresponding hardware instance.

8. The storage system according to claim 7, the second function operable to map each partition to a hardware instance such that the number of partitions associated with each hardware instance would be approximately equal.

9. The storage system according to claim 1, the de-duplication module configured to, in response to a change in the number of hardware instances, re-assign at least one partition to a different hardware instance selected from the plurality of hardware instances.

10. A method, comprising:
generating a fingerprint for an item of data stored on the storage array;
identifying a partition for the fingerprint;
associating the partition with a selected hardware instance selected from a plurality of hardware instances, wherein each particular hardware instance comprises one or more information handling resources; and
querying the selected hardware instance to determine whether the fingerprint exists on the hardware instance; wherein in order to identify each partition, calculating a function to identify a partition for each fingerprint; wherein the function is operable to map all possible fingerprints to a corresponding partition, wherein the function operable to map each fingerprint to a partition such that the number of fingerprints associated with each partition would be approximately equal.

11. The method according to claim 10, further comprising, responding, by each hardware instance, to the query with an indication of whether the fingerprint exists on the hardware instance.

12. The method according to claim 11, further comprising adding the fingerprint to the hardware instance if the fingerprint does not exist on the hardware instance.

13. The method according to claim 10, further comprising de-duplicating data associated with the fingerprint if the fingerprint exists on the hardware instance.

14. The method according to claim 10, in order to associate each partition with a hardware instance, calculation a second function to assign each partition to a hardware instance;
wherein the second function is operable to map all possible partitions to a corresponding hardware instance.

15. The method according to claim 14, the second function operable to map each partition to a hardware instance such that the number of partitions associated with each hardware instance would be approximately equal.

16. The method according to claim 10, further comprising, in response to a change in the number of hardware instances, re-assigning at least one partition to a different hardware instance selected from the plurality of hardware instances.

* * * * *